(12) United States Patent
Chan et al.

(10) Patent No.: US 12,321,559 B1
(45) Date of Patent: Jun. 3, 2025

(54) FLEXIBLE TOUCH SENSOR PANEL WITH METAL MESH AND SOLID CONDUCTOR

(71) Applicant: Apple Inc., Cupertino, CA (US)

(72) Inventors: Isaac W. Chan, San Jose, CA (US); Chun-Hao Tung, San Jose, CA (US); Sunggu Kang, San Jose, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/165,710

(22) Filed: Feb. 7, 2023

Related U.S. Application Data

(60) Provisional application No. 63/267,777, filed on Feb. 9, 2022.

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 2203/04102* (2013.01); *G06F 2203/04103* (2013.01); *G06F 2203/04107* (2013.01); *G06F 2203/04108* (2013.01); *G06F 2203/04112* (2013.01)

(58) Field of Classification Search
CPC ................. G06F 3/0446; G06F 3/0416; G06F 2203/04102; G06F 2203/04103; G06F 2203/04107; G06F 2203/04108; G06F 2203/04112
See application file for complete search history.

(56) References Cited

U.S. PATENT DOCUMENTS

| | | | |
|---|---|---|---|
| 9,146,414 B2 | 9/2015 | Chang et al. |
| 9,298,327 B2 | 3/2016 | Wenzel |
| 9,322,633 B2 | 4/2016 | Mlmaz et al. |
| 10,055,832 B2 | 8/2018 | Iwami |
| 10,409,432 B2 | 9/2019 | Cho et al. |
| 10,510,463 B2 | 12/2019 | Son et al. |
| 11,093,057 B2 | 8/2021 | Yao |
| 11,720,194 B2 | 8/2023 | Park et al. |

(Continued)

FOREIGN PATENT DOCUMENTS

| | | | |
|---|---|---|---|
| CN | 106681561 A | 5/2017 |
| CN | 115240561 A | 10/2022 |

(Continued)

*Primary Examiner* — Brent D Castiaux
(74) *Attorney, Agent, or Firm* — Kubota & Basol LLP

(57) ABSTRACT

A touch sensor panel can include a first touch electrode of a first type associated with a first touch node on the touch sensor panel, the first touch electrode electrically connected to a first trace configured to couple the first touch electrode to first touch circuitry, and a second touch electrode of a second type associated with the first touch node on the touch sensor panel, the second touch electrode electrically connected to a second trace configured to couple the second touch electrode to second touch circuitry. The first touch electrode can be formed by a solid and transparent conductive material in the touch sensor panel, the solid and transparent conductive material configured to provide shielding with respect to circuitry external to the touch sensor panel. The second touch electrode can be formed by a first metal mesh material in the touch sensor panel.

20 Claims, 9 Drawing Sheets

(56) References Cited

U.S. PATENT DOCUMENTS

| | | |
|---|---|---|
| 2014/0049271 A1 | 2/2014 | Trend |
| 2015/0145818 A1 | 5/2015 | Jeon et al. |
| 2015/0160754 A1* | 6/2015 | Wenzel ............. G06F 3/041662 345/174 |
| 2015/0309633 A1* | 10/2015 | Ho ........................ G06F 3/0412 345/173 |
| 2015/0346866 A1 | 12/2015 | Kusunoki et al. |
| 2016/0209688 A1 | 7/2016 | Kim et al. |
| 2016/0246435 A1* | 8/2016 | Kim ....................... G06F 3/0443 |
| 2018/0253175 A1* | 9/2018 | Yao ........................ G06F 3/0445 |
| 2020/0258969 A1* | 8/2020 | Yi .......................... G06F 3/0443 |
| 2022/0147214 A1* | 5/2022 | Kim ....................... G06F 3/0446 |
| 2023/0019482 A1 | 1/2023 | Lee et al. |
| 2024/0053842 A1 | 2/2024 | Zhang et al. |

FOREIGN PATENT DOCUMENTS

| | | |
|---|---|---|
| CN | 115657882 A | 1/2023 |
| KR | 101630817 B1 | 6/2016 |
| KR | 20170080892 A | 7/2017 |
| KR | 101845809 B1 | 5/2018 |
| WO | 2016/000281 A1 | 1/2016 |

\* cited by examiner

FLEXIBLE TOUCH SENSOR PANEL WITH METAL MESH AND SOLID CONDUCTOR

CROSS-REFERENCE TO RELATED APPLICATIONS

This application claims the benefit of U.S. Provisional Application No. 63/267,777, filed Feb. 9, 2022, the content of which is incorporated herein by reference in its entirety for all purposes.

FIELD OF THE DISCLOSURE

This relates generally to touch sensor panels, and more particularly to touch sensor panels that include metal mesh and solid conductive touch electrodes and/or traces.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the touch sensor panel, and objects approaching near the surface may be detected near the surface without actually touching the surface.

Some capacitive touch/proximity sensor panels can be formed by a matrix of plates (e.g., touch/proximity electrodes) made of solid and transparent conductive (STC) materials such as Indium Tin Oxide (ITO), silver nanowire (AgNW), or carbon nanotubes. Some touch/proximity sensing screens can be formed by at least partially integrating touch/proximity sensing circuitry into a display pixel stackup (i.e., the stacked material layers forming the display pixels). However, while STC materials can provide desirable shielding against noise from nearby electronics, such as a display, STC touch/proximity sensing electrodes may not provide sufficient mechanical flexibility for creating robust and flexible touch/proximity sensor panels. Additionally, STC touch/proximity sensing electrodes may compromise the touch/proximity sensitivity of a touch/proximity sensor panel, by shielding the fringing electric fields with which a touch/proximity input (such as a finger) interacts.

SUMMARY OF THE DISCLOSURE

A goal of the examples of the disclosure is a flexible touch/proximity sensor panel that can exhibit both high touch/proximity sensitivity, and noise shielding from nearby electronics, such as displays. Another goal of the examples of the disclosure is to simplify the touch/proximity sensor panel fabrication process by reducing the need for two layers of STC material. The examples of the disclosure are directed to touch/proximity sensor panels that include touch/proximity sensing electrodes and/or traces that are composed of a single layer of an STC material, which can provide for noise shielding, and also include touch/proximity sensing electrodes and/or traces that are composed of metal mesh materials, which can provide for increased mechanical flexibility and touch/proximity sensitivity. Although examples of the disclosure are applicable to both touch and proximity (hover) sensing, the examples of the disclosure described herein may refer to touch sensor panels, touch electrodes, and touch sensing for simplicity, with the understanding that the term "touch" is intended to be inclusive of touch and proximity (hover) sensing.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch/proximity sensor panels can be formed by a matrix of plates (e.g., touch/proximity electrodes) made of solid and transparent conductive (STC) materials such as Indium Tin Oxide (ITO), silver nanowire (AgNW), carbon nanotubes, graphene, partially-transparent silver conductive film, or alloy conductive film, etc. Some touch/proximity sensing screens can be formed by at least partially integrating touch/proximity sensing circuitry into a display pixel stackup (i.e., the stacked material layers forming the display pixels). However, while STC materials can provide desirable shielding against noise from nearby electronics, such as a display, STC touch/proximity sensing electrodes may not provide sufficient mechanical flexibility for creating robust and flexible touch/proximity sensor panels. Additionally, STC touch/proximity sensing electrodes may compromise the touch/proximity sensitivity of a touch/proximity sensor panel, by shielding the fringing electric fields with which a touch/proximity input (such as a finger) interacts.

A goal of examples of the disclosure is a flexible touch/proximity sensor panel that can exhibit both high touch/proximity sensitivity, and noise shielding from nearby electronics, such as displays. Another goal of the examples of the disclosure is to simplify the touch/proximity sensor panel fabrication process by reducing the need for two layers of STC material. The examples of the disclosure are directed to touch/proximity sensor panels that include touch/proximity sensing electrodes and/or traces that are composed of a single layer of an STC material, which can provide for noise shielding, and also include touch/proximity sensing electrodes and/or traces that are composed of metal mesh materials, which can provide for increased mechanical flexibility and touch/proximity sensitivity. Although examples of the disclosure are applicable to both touch and proximity (hover) sensing, the examples of the disclosure described herein may refer to touch sensor panels, touch electrodes, and touch sensing for simplicity, with the understanding that the term "touch" is intended to be inclusive of touch and proximity (hover) sensing.

Figure 1A:
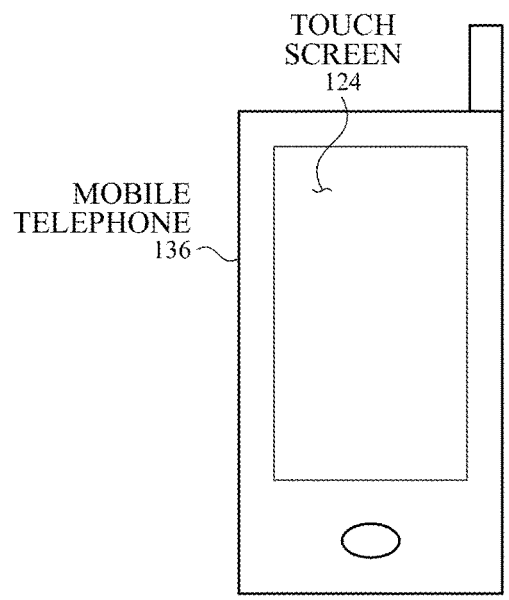
FIGS. 1A-1D illustrate an example mobile telephone, an example media player, an example personal computer and an example tablet computer that can each include an exemplary touch screen according to examples of the disclosure.
Figure 1B:
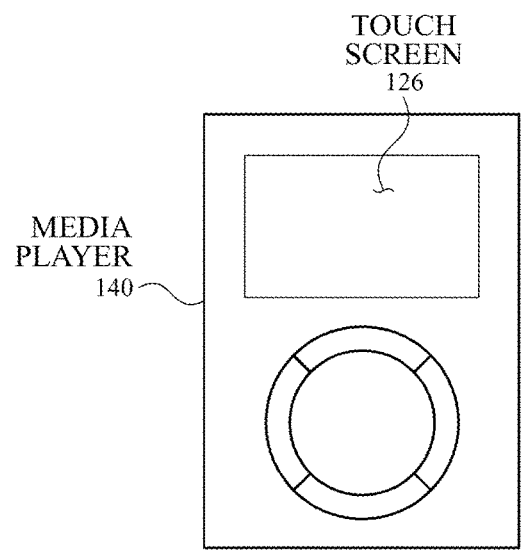
Figure 1C:
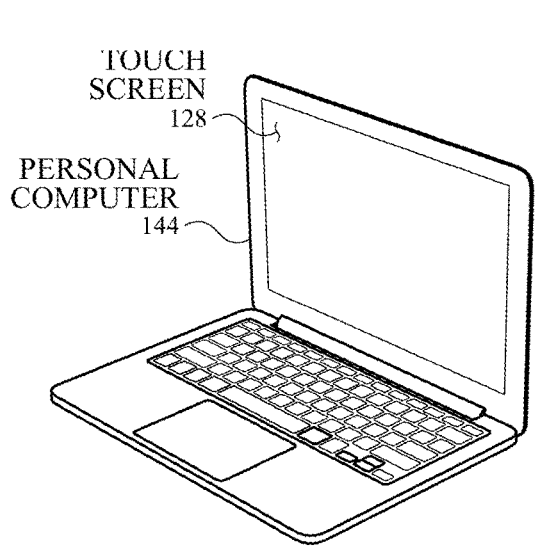
Figure 1D:
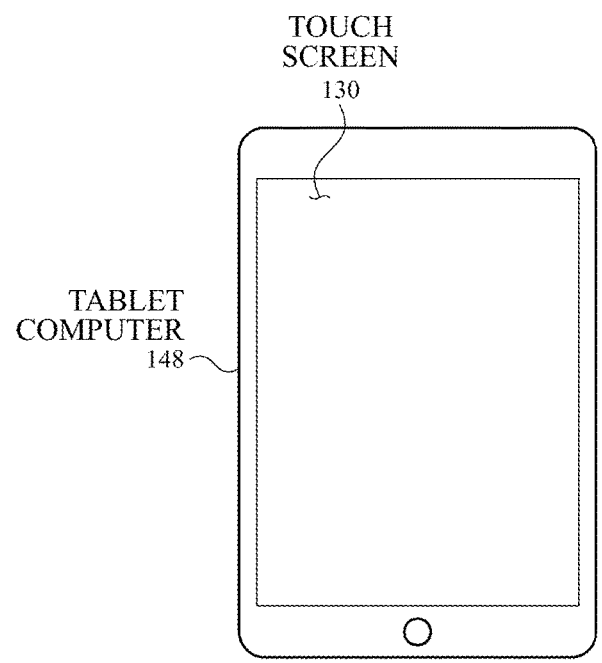

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices. Further, it is understood that while some examples of the disclosure are described in the context of a touch screen, those examples can similarly be implemented in the context of a touch sensor panel, and vice versa.

Figure 2:
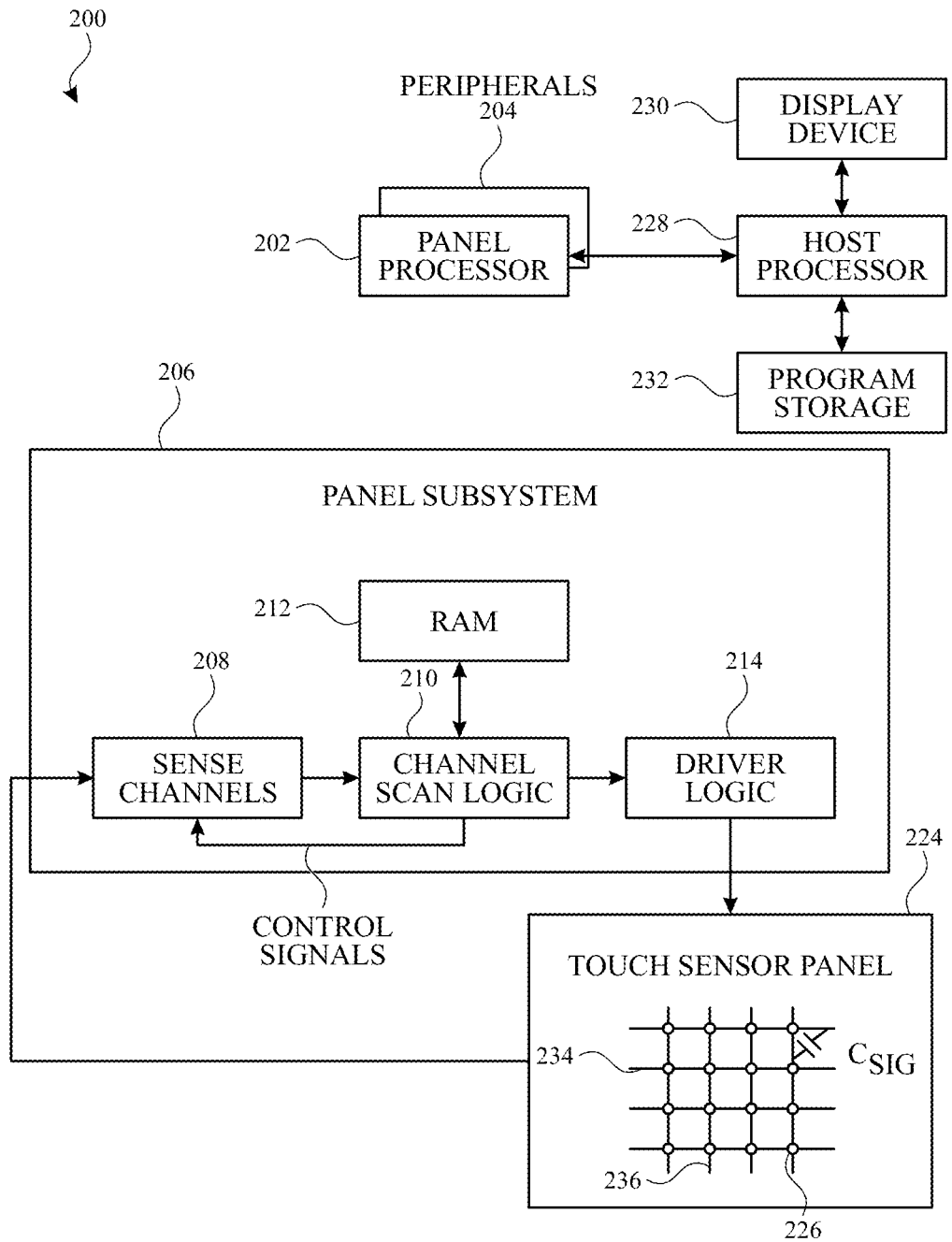
FIG. 2 illustrates an exemplary computing system including a capacitive touch sensor panel according to examples of the disclosure.

FIG. 2 illustrates an exemplary computing system 200 including a capacitive touch sensor panel 224 according to examples of the disclosure. Touch sensor panel 224 can correspond to one or more of touch screens 124, 126, 128 and 130. Computing system 200 can include one or more panel processors 202, peripherals 204, and panel subsystem 206. Peripherals 204 can include, but are not limited to, random access memory (RAM) or other types of memory or storage, watchdog timers and the like. Panel subsystem 206 can include, but is not limited to, one or more sense channels 208, channel scan logic 210 (analog or digital) and driver logic 214 (analog or digital). Touch sensor panel 224 can include row electrodes 234 and column electrodes 236. In mutual capacitance touch sensor panel examples, stimulation signals from driver logic 214 can be driven onto row electrodes 234, and sense signals on column electrodes 236 can be sensed by sense channels 208. Touch or proximity events can alter the capacitive coupling Csig between row electrodes 234 and column electrodes 236 at touch nodes 226 and cause a change to the sense signals on column electrodes 236. However, in self-capacitance touch sensor panel examples, driver logic 214 and sense channel 208 blocks can be combined, and the touch sensor panel can be driven and sensed on both row electrodes 234 and column electrodes 236. Channel scan logic 210 can access RAM 212, autonomously read data from sense channels 208 and provide control for the sense channels. In addition, channel scan logic 210 can control driver logic 214 to generate stimulation signals that can be sequentially or simultaneously applied to the row electrodes 234 of touch sensor panel 224. In some examples, panel subsystem 206, panel processor 202 and peripherals 204 can be integrated into a single application specific integrated circuit (ASIC) that can be referred to herein as a touch controller.

In some examples, touch screens 124, 126, 128 and 130 can be based on self-capacitance. A self-capacitance-based touch system can include a matrix of small, individual plates of conductive material that can be referred to as touch node electrodes. For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance-based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 shown in FIG. 1 can be based on mutual capacitance. In mutual capacitance sensing examples, touch sensor panel 224 can include a capacitive sensing medium having one or more touch electrodes of a first type, such as drive electrodes, and one or more touch electrodes of a second type, such as sense electrodes. In some touch sensor panels, drive and sense electrodes can be formed from a solid and transparent conductive medium such as ITO, although other transparent and non-transparent materials such as copper can also be used. Each adjacency of drive and sense electrodes can represent a capacitive sensing node and can be viewed as touch picture element (touch pixel) or touch node 226, which can be particularly useful when touch sensor panel 224 is viewed as capturing an "image" of touch or proximity. (In other words, after panel subsystem 206 has determined whether a touch or proximity event has been detected at each sense electrode in the touch sensor panel, the pattern of sense electrodes in the touch sensor panel at which a touch or proximity event occurred can be viewed as an "image" of touch or proximity (e.g., a pattern of fingers touching or hovering over the panel).). The capacitance between the drive and sense electrodes and local system ground can appear as a stray capacitance Cstray, and the capacitance at the intersections of the drive and sense electrodes, i.e., the touch nodes, can appear as a mutual signal capacitance Csig between the drive and sense electrodes when the given drive electrode is stimulated with an alternating current (AC) signal. The presence of a finger or other object (such as a stylus) near or on the touch sensor panel can be detected by measuring changes to a signal charge present at the nodes being touched, which can be a function of Csig. Touch nodes may vary in their sensitivity to such objects. Touch nodes with higher sensitivity may be better able to detect objects near or on the touch sensor panel, and at a greater distance from the touch sensor panel, than touch nodes with lower sensitivity. Each sense electrode of touch sensor panel 224 can be coupled to a sense channel 208 in panel subsystem 206. Touch sensor panel 224 can cover a portion or all of a surface of a device.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can also include host processor 228 for receiving outputs from panel processor 202 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to panel processing, and can be coupled to program storage 232 and display device 230 such as an LCD display for providing a UI to a user of the device. Display device 230 together with touch sensor panel 224, when located partially or entirely under the touch sensor panel, can form a touch screen.

In some examples, touch sensor panel 224 and display device 230 together can form an integrated touch screen in which touch sensing circuit elements of the touch sensing system (e.g., sense electrodes) can be integrated into the display pixel stackups of display device 230. The circuit elements in an integrated touch screen can include, for example, elements that can exist in LCD or other displays, such as one or more display pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor.

Note that one or more of the functions described herein can be performed by firmware stored in memory (e.g., one of the peripherals 204 in FIG. 2) and executed by panel processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 3A:
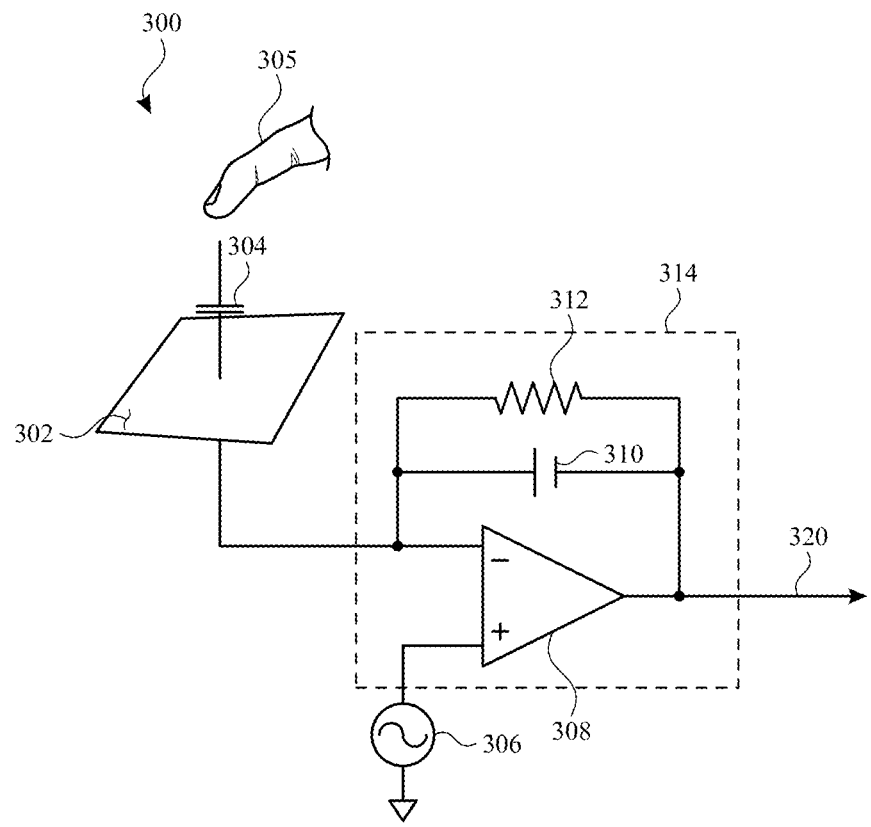
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
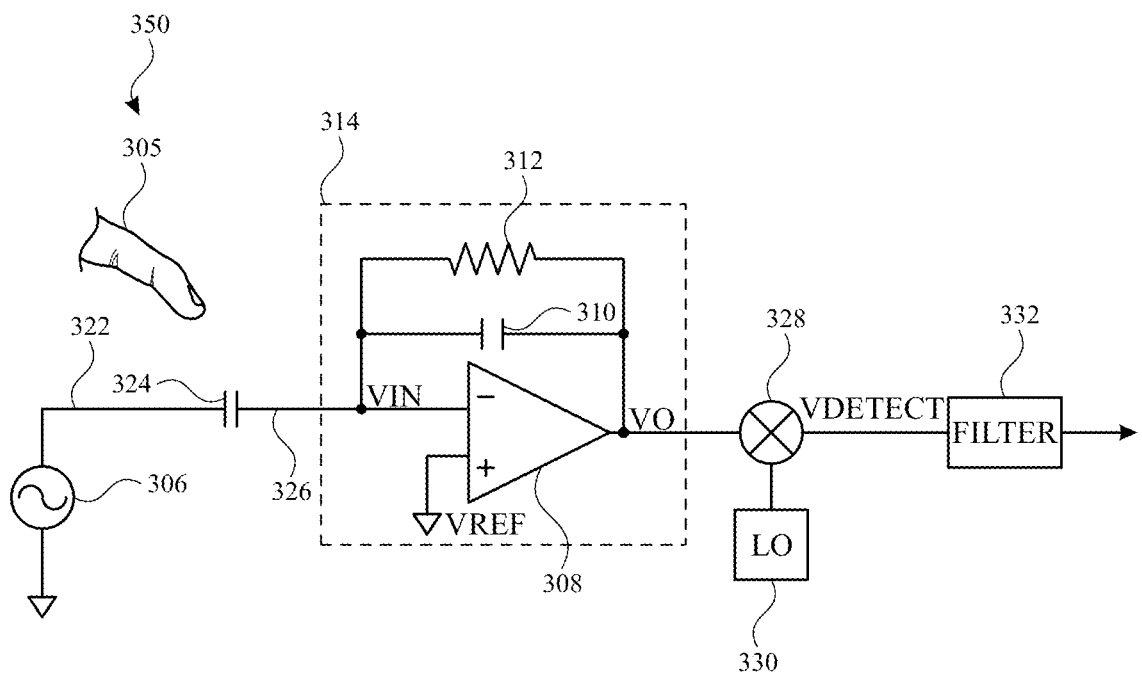
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive 322 and sense 326 line and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred.

Figure 4A:
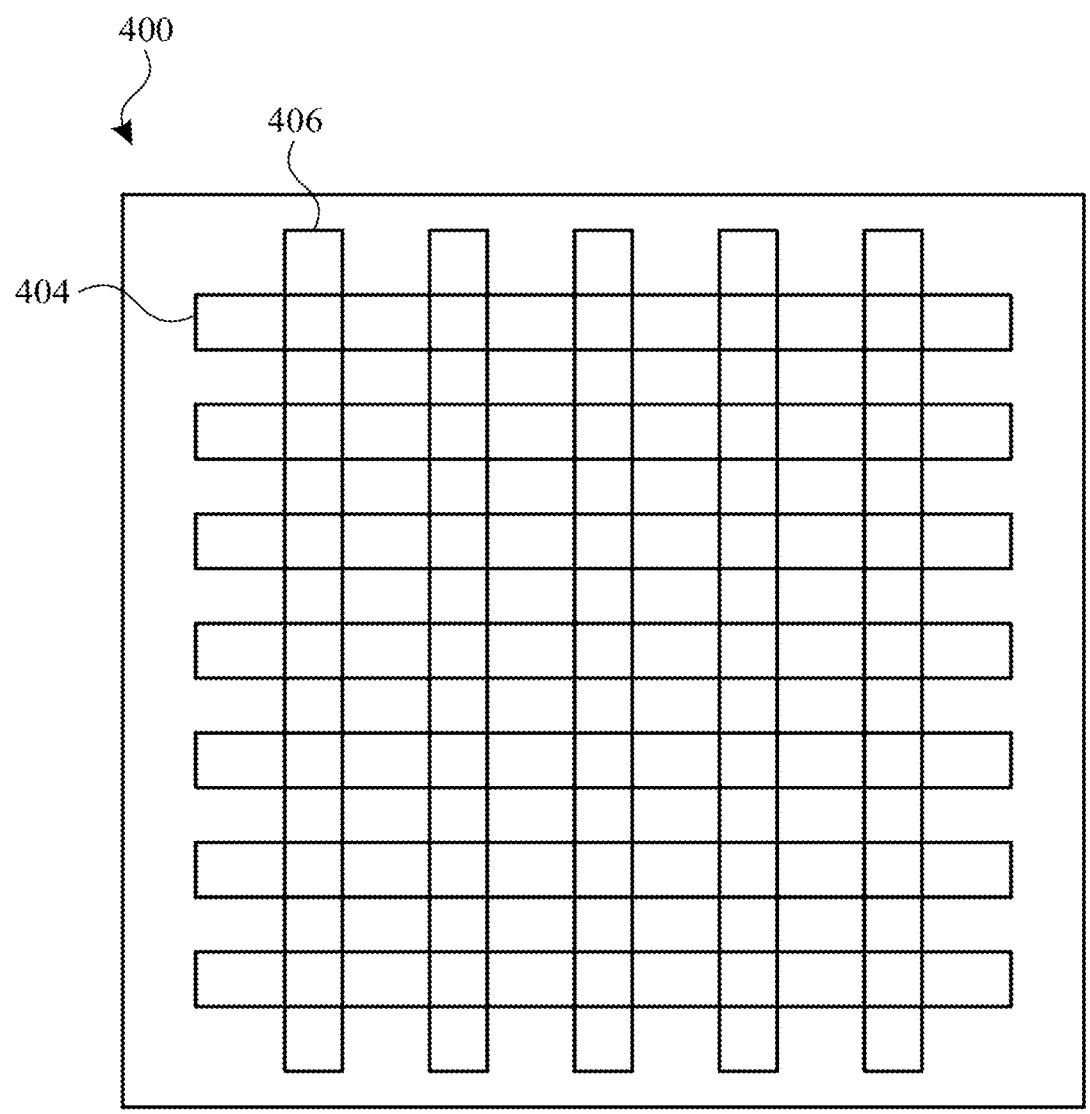
FIG. 4A illustrates an exemplary touch sensor panel with touch electrodes arranged in rows and columns according to examples of the disclosure.

FIG. 4A illustrates an example touch sensor panel 400 with touch electrodes 404 and 406 arranged in rows and columns according to examples of the disclosure. Specifically, touch sensor panel 400 can include a plurality of touch electrodes 404 disposed as rows, and a plurality of touch electrodes 406 disposed as columns. In some examples, as illustrated in FIG. 4A, touch electrodes 404 and touch electrodes 406 can be on different material layers on touch sensor panel 400, and can cross each other (without touching). In some examples, touch sensor panel 400 can sense the self-capacitance of touch electrodes 404 and 406 to detect touch and/or proximity activity on touch sensor panel 400, and in some examples, touch sensor panel 400 can sense the mutual capacitance between touch electrodes 404 and 406 to detect touch and/or proximity activity on touch sensor panel 400.

Figure 4B:
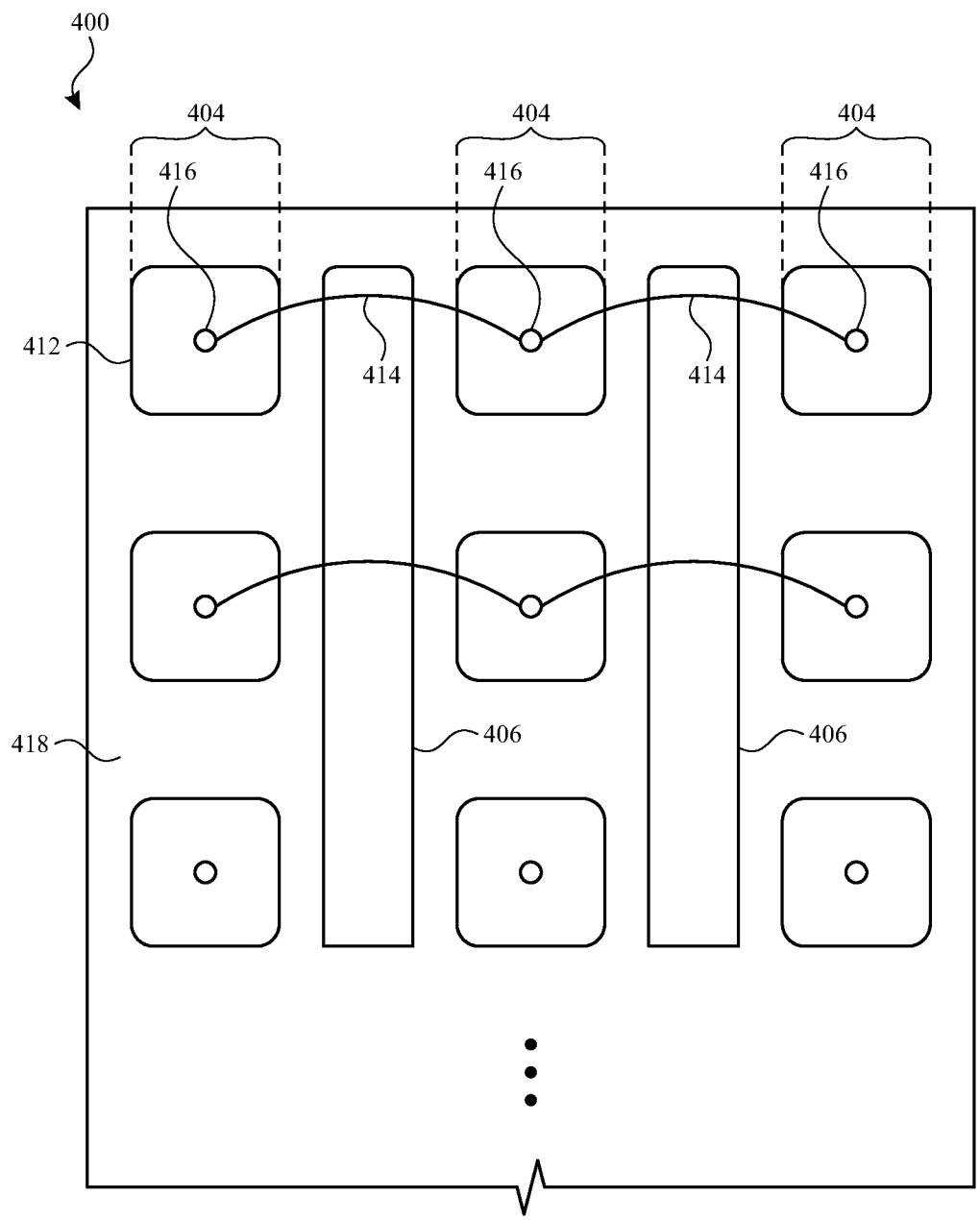
FIG. 4B illustrates an exemplary touch sensor panel with touch electrodes arranged in a single layer according to examples of the disclosure.

FIG. 4B illustrates an example touch sensor panel 400 with touch electrodes 404 and 406 in a single layer according to examples of the disclosure. In FIG. 4B, touch electrodes 404 can comprise one or more touch electrode segments 412 that are electrically connected by links 414 at connections 416. In FIG. 4B, touch electrode segments 412 and links 414 are not electrically connected to touch electrodes 406. In some examples, touch sensor panel 400 can sense the self-capacitance of touch electrodes 404 and 406 to detect touch and/or proximity activity on touch sensor panel 400, and in some examples, touch sensor panel 400 can sense the mutual capacitance between touch electrodes 404 and 406 to detect touch and/or proximity activity on touch sensor panel 400. Example touch sensor panel 400 may include a shielding layer 418, disposed below touch electrodes 404 and 406, to shield touch electrodes 404 and 406 from noise from below the touch sensor panel.

Figure 4C:
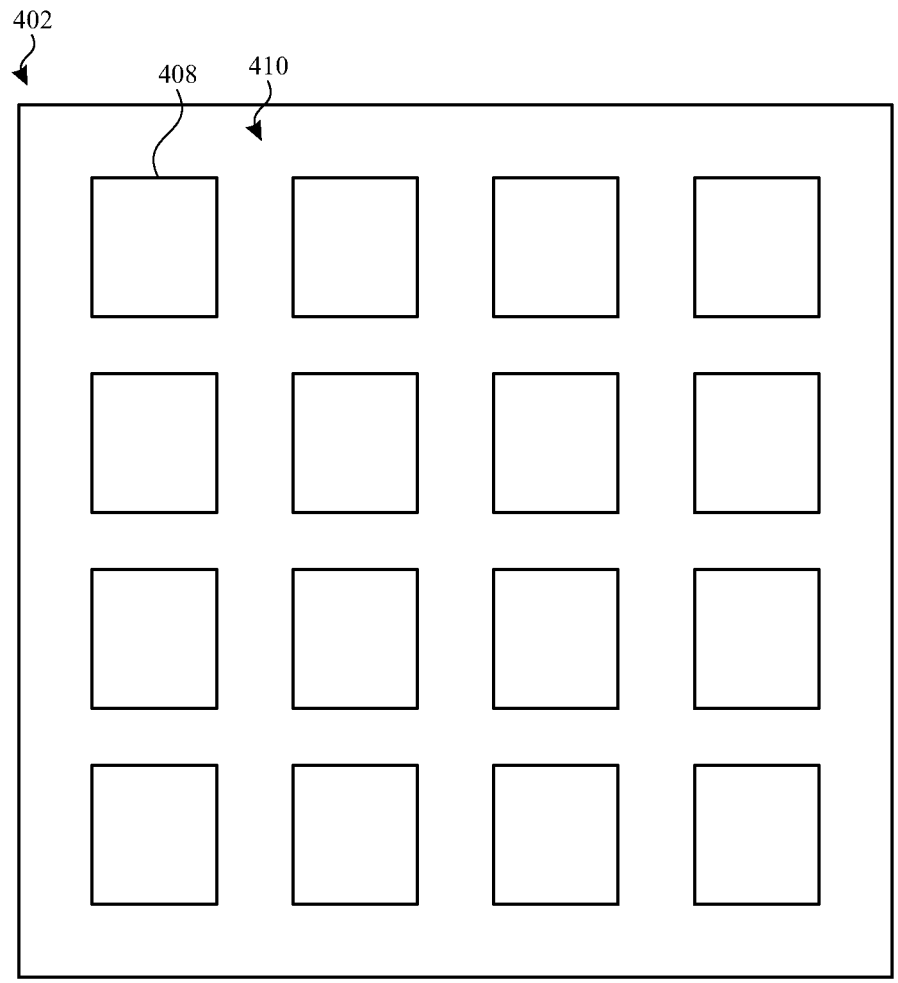
FIG. 4C illustrates an exemplary touch sensor panel with touch node electrodes arranged in a pixelated touch node electrode configuration according to examples of the disclosure.

FIG. 4C illustrates an example touch sensor panel 402 with touch node electrodes 408 arranged in a pixelated touch node electrode configuration according to examples of the disclosure. Specifically, touch sensor panel 402 can include a plurality of individual touch node electrodes 408, each touch node electrode identifying or representing a unique location on the touch sensor panel at which touch or proximity (i.e., a touch or proximity event) is to be sensed, and each touch node electrode being electrically isolated from the other touch node electrodes in the touch sensor panel. Touch node electrodes 408 can be on the same or different material layers on touch sensor panel 402. In some examples, touch sensor panel 402 can sense the self-capacitance of touch node electrodes 408 to detect touch and/or proximity activity on touch sensor panel 402, and in some examples, touch sensor panel 402 can sense the mutual capacitance between touch node electrodes 408 to detect touch and/or proximity activity on touch sensor panel 402. In some examples, such as shown in FIG. 4C, touch sensor panel 402 can include a shielding layer 410, disposed below touch node electrodes 408, to shield touch node electrodes 408 from noise from below the touch sensor panel.

In some examples, touch electrodes 404 and/or 406 in FIGS. 4A and 4B, and/or touch node electrodes 408 in FIG. 4C, can be formed of a STC material, such as ITO or AgNW. In some examples, shielding layers 418 in FIG. 4B and/or 410 in FIG. 4C can also be formed of a STC material. Such materials can provide desirable shielding of the touch sensor panel from noise, such as from nearby electronics. For example, in a touch screen, a drive layer or shielding layer formed of a STC material may shield touch electrodes disposed above the drive layer or shielding layer from noise contributed by the touch screen's display circuitry. However, it can be desirable for the touch sensor panels of the disclosure to be flexible, and in some examples, touch electrodes formed of STC materials may have insufficient mechanical flexibility to allow for a touch sensor panel of which they are a part to achieve a desired flexibility. For example, touch electrodes formed of ITO may crack or otherwise become damaged when a touch sensor panel is flexed. Additionally, touch electrodes formed of STC material may contribute to low touch sensitivity of the touch sensor panel. For example, in some examples based on mutual capacitance, such as described above, STC material in a sense layer may shield the fringing electric fields that are used to detect touch events. This may limit the degree to which objects near or on the touch electrode can be detected. To address this, some examples of the disclosure are directed to touch sensor panels that include one or more layers of touch electrodes (and/or other touch sensor panel components) formed of metal mesh, in combination with a layer of touch electrodes formed of STC material, such as ITO. This combination can provide for greater touch sensitivity and mechanical flexibility than STC touch electrodes (and/or other touch sensor panel components) alone, while still retaining the shielding benefits of STC materials. Additionally, economic benefits can be realized by replacing STC materials, which may be expensive and/or in limited supply, with metal mesh materials.

Metal mesh materials can be composed of micro- or nano-grids with periodic or non-periodic metal lines (e.g., Cu, Ni, Al, Au, etc.). Metal meshes can exhibit good mechanical flexibility, and low sheet resistance. Specifically, because the thicknesses of these metal lines can be much greater than that of metal films (e.g., ITO films), the conductivity of metal meshes can be close to that of their bulk material counterparts, which can be significantly higher than that of metal films (e.g., ITO films). Solid metal films and/or metal meshes may occupy a contiguous region of an electrode. It is understood that, within such an electrode region (or a dummy region), solid metal films and/or metal meshes may include regions of conductive material separated by gaps, or regions of nonconductive material. A particular material may comprise either a solid metal film or a metal mesh, depending on the patterning of that material in an electrode region. Whether a material comprises a solid metal film or a metal mesh can be determined, for example, by considering a ratio, by surface area, of conductive material (e.g., portions of the material that conduct electricity, such as individual strands of conductive material that make up a metal mesh material) to nonconductive material (e.g., portions of the material that do not conduct electricity, such as gaps between individual strands of conductive material that make up a metal mesh material). In some examples, this ratio can be determined in a given region of the material (e.g., the given region of the material can be within the boundaries of a touch electrode or dummy region of material or any contiguous material region, such that gaps in material coverage resulting from patterning of the material into electrodes/dummy regions are not considered when determining whether a given material film is a solid or a mesh/grid). In the context of this disclosure, the above ratio for solid metal films can be at least 75 percent, and in contrast, the ratio for a mesh (or grid) can be less than 75 percent. It is understood that, based on the above definition, a given material (e.g., a nanowire material, ITO, etc.) may be considered a solid metal film or a mesh/grid depending on how it is patterned, and the effect of such patterning on the above-described ratio.

Examples of the disclosure are directed to touch sensor panels in which some touch electrodes (and/or other touch sensor panel components) are formed from metal mesh materials, and other touch electrodes (and/or other touch sensor panel components) are formed from a STC material such as ITO, to create touch sensor panels with improved mechanical flexibility and improved touch sensitivity that are also shielded from noise. In some examples, touch electrodes formed from metal mesh materials are a first type, such as sense electrodes (e.g., sense lines), and touch electrodes formed from a STC material (alone or in combination with metal mesh materials) are a second type, such as drive electrodes (e.g., drive lines). Some such touch sensor panels can be folded along an axis with a reduced risk of deformation, fracture, or mechanical failure compared to some touch sensor panels. While the examples of the disclosure may be described in the context of a touch screen, it is understood that the examples of the disclosure can similarly be implemented in a touch sensor panel with or without an associated display.

Figure 5:
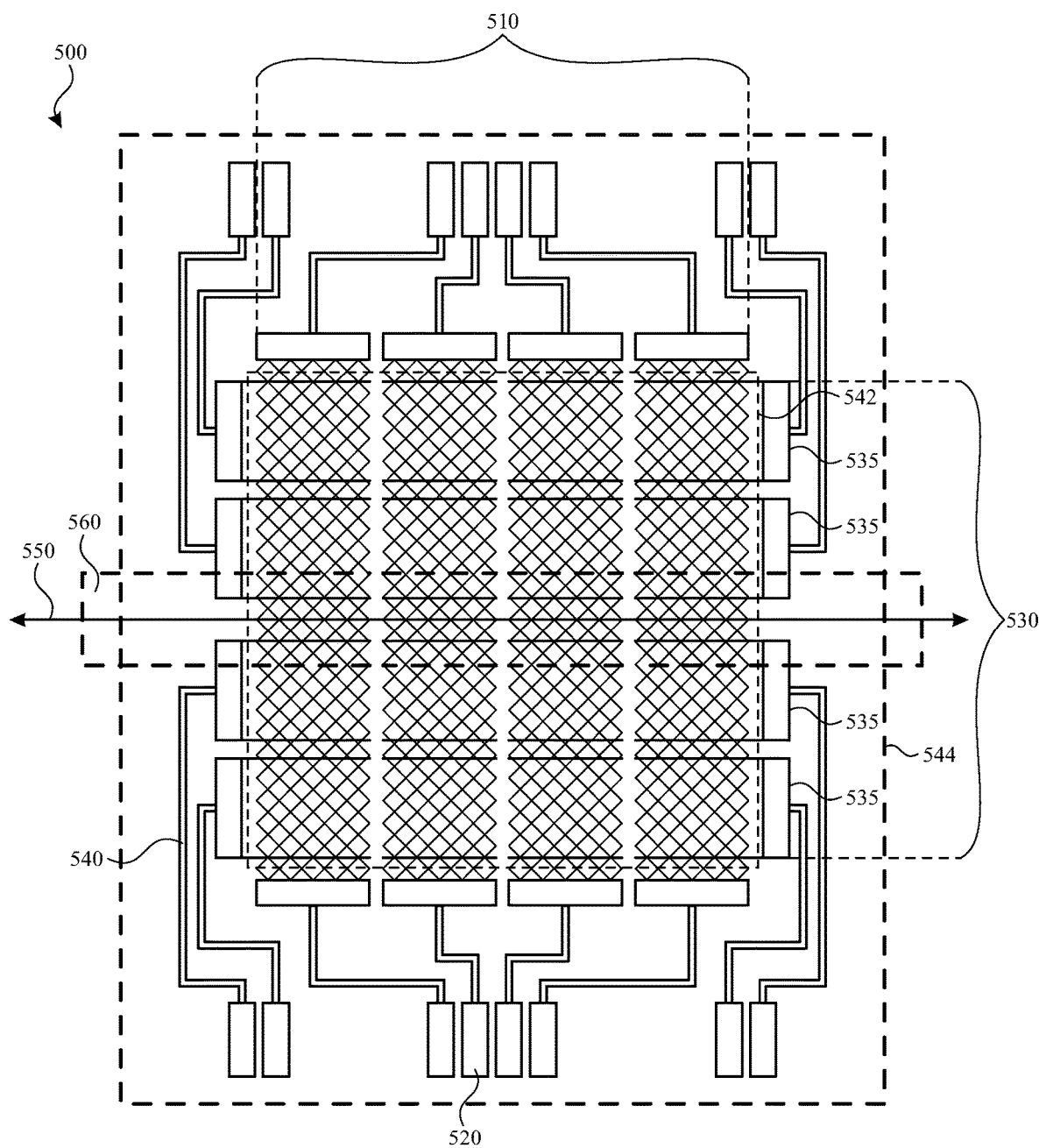
FIG. 5 illustrates an overhead view of an exemplary touch sensor panel including a sense layer and a drive layer according to examples of the disclosure.

FIG. 5 illustrates an overhead view of a flexible touch sensor panel 500 including a sense layer and a drive layer according to examples of the disclosure. Two parallel layers of touch sensor panel 500 are depicted in FIG. 5. An exemplary sense layer includes vertical sense lines 510, comprising metal mesh material, coupled to copper trace routing 520; and an exemplary drive layer includes horizontal drive lines 530, comprising STC material, such as ITO or AgNW, coupled to copper trace routing 540. However, it should be understood that the "horizontal" and "vertical" designations are only relative to the orientation of FIG. 5, and that in other examples a drive layer can include vertical drive lines and a sense layer can include horizontal sense lines. Other sense electrode and drive electrode configurations are also contemplated. In some examples, the drive layer includes metal mesh materials in addition to STC material. In some examples, touch sensor panel 500 may include a viewable area 542 and a trace area 544 (which does not include the viewable area 542). Touch electrodes, such as sense lines 510 and drive lines 530, may be disposed within the viewable area 542, such that viewable area 542 indicates the region of the touch sensor panel that detects touch input. Trace routing, including 520 and 540, can be disposed within the trace area 544; in some examples, a passivation layer can be deposited in trace area 544 to protect the trace routing from its environment. In some examples, trace area 544 may include an opaque material to obscure the trace routing from view.

Some touch sensor panels are not designed to be folded, and doing so may result in excessive strain on a STC layer in the touch sensor panel, the strain concentrated in the STC regions closest to the fold axis. Such strain could result in deformation or mechanical failure of a STC layer of the touch sensor panel. In contrast to such touch sensor panels, touch sensor panel 500 can be configured to fold along axis 550, with folding along axis 550 resulting in a curvature of touch sensor panel 500 in folding zone region 560. In some examples, drive lines 530 of touch sensor panel 500 may be patterned into coplanar rows 535, the rows aligned parallel to axis 550 and arranged such that axis 550 does not intersect drive lines 530. In some examples, each of rows 535 can be coupled to routing traces 540. This example configuration may permit the drive layer to be folded along axis 550 without excessive strain placed on the drive layer material. It should be understood that, although FIG. 5 depicts four such rows 535, the disclosure is not directed to any particular number of rows 535. In the example depicted, the sense layer is comprised of columns of metal mesh materials, which due to their mechanical flexibility may be folded along axis 550 with a reduced risk of deformation or failure compared to some other materials, such as STC materials.

Although touch sensor panel 500 shown in FIG. 5 includes a drive layer patterned into rows, and a sense layer patterned into columns, the disclosure is not limited to any particular configuration or orientation of rows and/or columns. Nor is the disclosure limited to separate drive and sense layers such as shown in FIG. 4A. For example, the disclosure extends to mutual capacitance sensors in which drive electrodes and sense electrodes occupy a single layer, such as shown in FIG. 4B. Similarly, the disclosure is not limited to row/column configurations such as shown in FIG. 4A. For example, the disclosure extends to pixelated self-capacitance sensors, such as shown in FIG. 4C. Such examples may benefit from both the flexibility of metal mesh and the shielding capabilities of STC material.

Figure 6A:
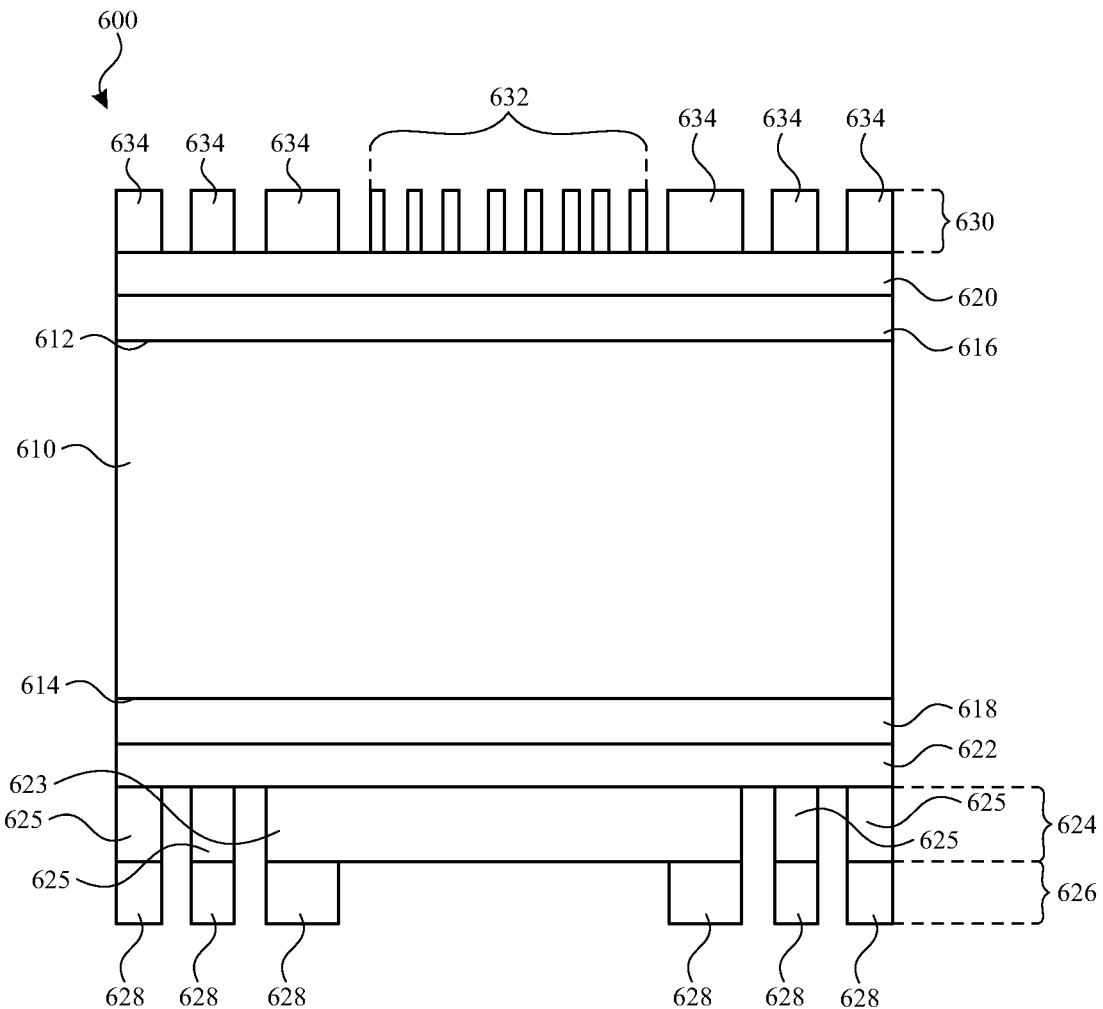
FIGS. 6A-6B illustrate exemplary material stackups of an exemplary touch sensor panel according to examples of the disclosure.
Figure 6B:
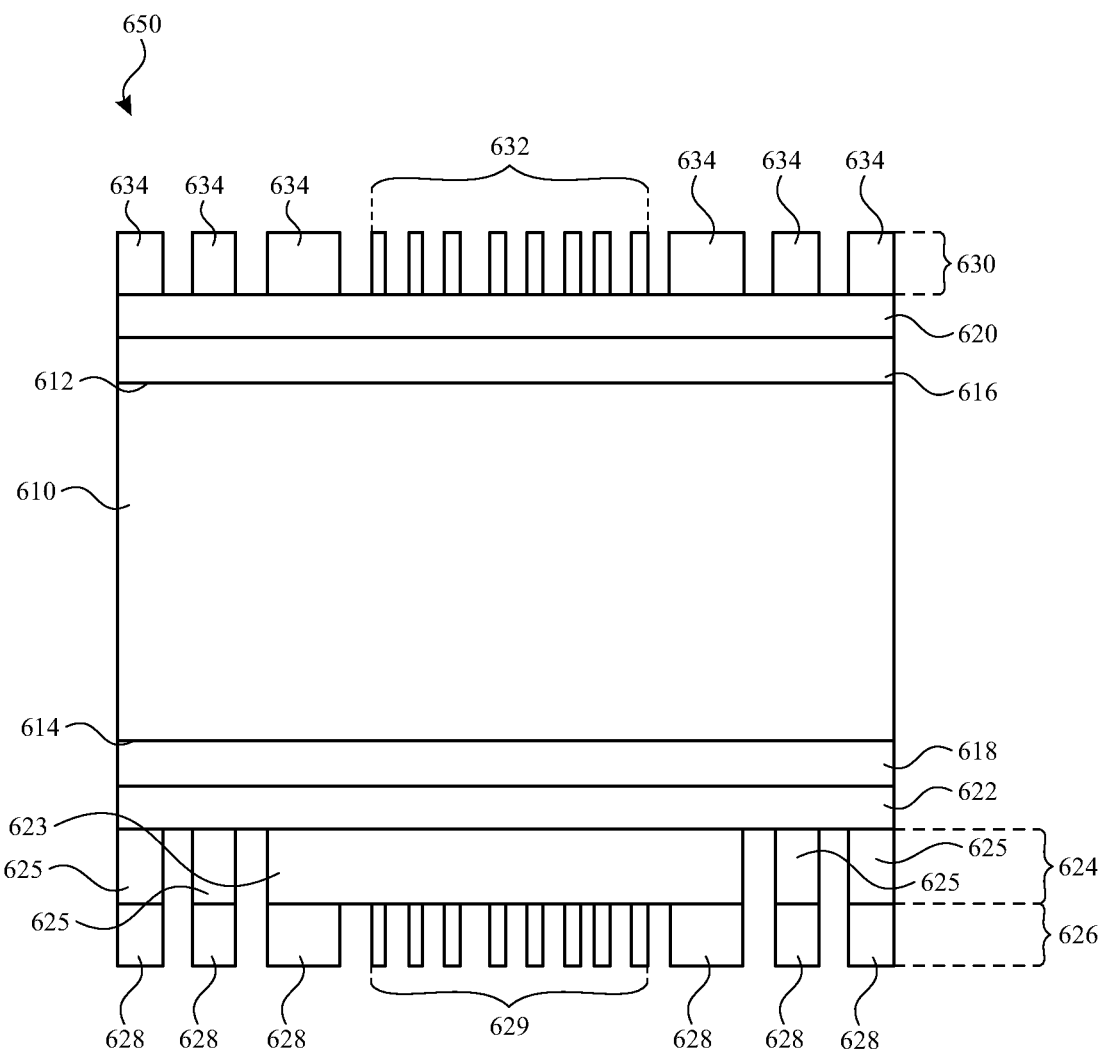

FIGS. 6A and 6B illustrate exemplary material stackups of a touch sensor panel according to examples of the disclosure. In the example shown in FIG. 6A, material stackup 600 includes a substrate layer 610, which may be comprised of a material such as cyclic olefin polymer (COP). Stackup 600 can include one or more hard-coat layers, shown in FIG. 6A as layers 616 and 618. Such hard-coat layers can provide a protective barrier for substrate 610, making the substrate more resistant to physical damage, such as scratches. Stackup 600 can include one or more index-matching layers, shown in FIG. 6A as layers 620 and 622. Index-matching layers can reduce undesirable reflections and fringing that may result from a refractive index mismatch between adjacent layers. Layer 616 can be disposed above top surface 612 of substrate 610 (e.g., layer 616 can be in contact with top surface 612). Layer 620 can be disposed above layer 616 (e.g., layer 620 can be in contact with layer 616, and layer 616 can be disposed between layer 620 and layer 610). Layer 618 can be disposed below bottom surface 614 of substrate 610 (e.g., layer 618 can be in contact with bottom surface 614). Layer 622 can be disposed below layer 618 (e.g., layer 622 can be in contact with layer 618, and layer 618 can be disposed between layer 622 and layer 610). Layer 624 can include drive lines 623 (corresponding to 530 in FIG. 5) and conductive traces 625, the drive lines 623 and conductive traces 625 comprising STC material, and conductive traces 625 coupling drive lines 623 to touch circuitry (although the coupling is not shown in the cross-sectional views of FIGS. 6A and 6B). Layer 624 can be disposed below substrate layer 610 (e.g., layer 624 can be in contact with surface 614, layer 618, and/or layer 622). In the example shown in FIG. 6A, layer 624 is disposed adjacent to index-matching layer 622. Layer 626 may include routing traces 628 (corresponding to routing traces 540 in FIG. 5), formed from copper (or another suitable conductive material) deposited on layer 624, and coupled to the drive lines 623 and conductive traces 625 of layer 624.

In some examples, routing traces 628 and conductive traces 625 can be formed by a common etching process, resulting in each of conductive traces 625 corresponding to one of routing traces 628. That is, below each conductive trace 625 may be disposed a routing trace 628 having a same shape as the respective conductive trace. This is shown in FIG. 6A by routing traces 628 disposed below each of conductive traces 625. However, while drive lines 623 may be coupled to routing traces 628, in some examples, drive lines 623 need not correspond to routing traces 628 having the same shape. This is shown in FIG. 6A by the region of drive lines 623 below which no routing traces are disposed. In FIG. 6A, layer 630 can include sense lines 632 (corresponding to sense lines 510 in FIG. 5) formed above substrate layer 610 from metal mesh materials, as well as routing traces 634 (corresponding to routing traces 520 in FIG. 5) coupled to sense lines 632. As with routing traces 628, routing traces 634 may be formed from copper or another suitable conductive material. In some examples, none of the layers between sense lines 632 and substrate 610 include STC material. In examples in which a display screen or other circuitry is disposed below the touch sensor panel, the STC material in layer 624 can provide noise shielding between the display screen or other circuitry and sense lines 632 of the touch sensor panel. It may be beneficial for the STC material in layer 624 to be disposed directly below the sense lines 632, such that the sense lines 632 are aligned with solid regions of STC material directly below and can be shielded from noise by those regions. In some examples, gaps can exist between regions of STC material in layer 624, where sense lines 632 are not disposed directly above the gaps (e.g., patterning STC material in layer 624 in the same or a similar manner as sense lines 632 in layer 630). These gaps may be beneficial by reducing the use of potentially costly STC material where its noise shielding benefits are less crucial—that is, where sense lines 632 are not disposed directly above the gaps.

FIG. 6B illustrates an example stackup 650 that is a variation of the example stackup 600 shown in FIG. 6A. Example stackup 650 includes all of the elements of example stackup 600, as described above with respect to FIG. 6A. However, layer 626 of example stackup 650 also includes metal mesh 629, in addition to routing traces 628. The inclusion of metal mesh 629 allows for a lower sheet resistance of STC layer 624 compared to the example stackup 600 shown in FIG. 6A, thus permitting better and more efficient shielding performance. Additionally, compared to example stackup 600 shown in FIG. 6A, the lower sheet resistance may allow example stackup 650 to be more easily scaled to larger panel sizes. However, compared to example stackup 600 shown in FIG. 6A, incorporating metal mesh 629 can potentially introduce or exacerbate pattern visibility issues, and may add expense and complexity associated with manufacturing touch sensor panels using metal mesh materials.

In some examples, such as shown in FIG. 6B, metal mesh 629 is disposed below layer 624 (e.g., metal mesh 629 can be in contact with layer 624). In other examples (not shown), metal mesh 629 is disposed above layer 624, or embedded in layer 624 (e.g., metal mesh 629 can be in contact with layer 624). In the example shown in FIG. 6B, metal mesh 629 is in the same layer as routing traces 628. In other examples (not shown), metal mesh 629 and routing traces 628 may occupy two separate layers. However, including metal mesh 629 and routing traces 628 in a single layer, rather than in separate layers, can reduce the overall number of layers required and may have the benefits of reducing the overall touch sensor panel thickness and reducing the complexity of the fabrication process.

In some examples, the example stackups 600 and 650 shown in FIGS. 6A and 6B may correspond to mutual capacitance touch sensor panels, in which drive electrodes and sense electrodes occupy a single layer, such as shown in FIG. 4B. In some such examples, sense electrodes and drive electrodes (such as touch electrodes 404 and 406 shown in FIG. 4B) can occupy layer 630 in FIGS. 6A and 6B, and be formed of metal mesh, similarly to sense lines 632 in FIGS. 6A and 6B. Additionally, a shield layer (such as shield layer 418 shown in FIG. 4B), may be disposed below touch electrodes 404 and 406, formed of STC material, and patterned such as described above with respect to drive lines 530 shown in FIG. 5. Metal mesh may also be included, such as described with respect to metal mesh 629 in FIG. 6B, to lower the sheet resistance of the shield layer (such as shield layer 418).

In some examples, the example stackups 600 and 650 shown in FIGS. 6A and 6B may correspond to pixelated self-capacitance sensors, such as shown in FIG. 4C. In some such examples, touch node electrodes (such as touch node electrodes 408 in FIG. 4C) can occupy layer 630 in FIGS. 6A and 6B, and be formed of metal mesh, similarly to sense lines 632 in FIGS. 6A and 6B. Additionally, a shield layer (such as shield layer 410 shown in FIG. 4C), may be disposed below touch node electrodes 408, formed of STC material, and patterned such as described above with respect to FIG. 5. Metal mesh may be also included, such as described with respect to 629 in FIG. 6B, to lower the sheet resistance of the shield layer (such as shield layer 410).

The use of metal mesh for touch electrodes (and/or other touch sensor panel components) of example stackups 600 and 650 of touch sensor panels may afford several advantages over touch sensor panels in which touch electrodes (and/or other touch sensor panel components) are formed from STC materials. As noted above, the use of metal mesh in the touch sensor panel can allow the touch sensor panel to be folded along an axis with a reduced risk of deformation, fracture, or mechanical failure. Additionally, in some touch sensor panels that detect touch input by detecting changes in mutual capacitance between a sense electrode (such as sense lines 632 in FIGS. 6A and 6B) and a drive electrode (such as drive lines 623 in FIGS. 6A and 6B), use of metal mesh materials instead of STC materials for the sense electrode can result in greater touch sensitivity. This is because STC materials may shield the fringing electric fields that extend above the sense electrode, and with which touch inputs, such as provided by human fingers, interact. When the extent and/or flux of these fringing fields is limited, such as by shielding, a touch input is less able to create changes in mutual capacitance that can be detected by the touch sensor panel. This limits touch sensitivity and thus limits the usefulness of the touch sensor panel. For example, a lower sensitivity touch sensor panel may exhibit higher latency and lower spatial resolution, reliability, and energy efficiency in comparison to a touch sensor panel of higher sensitivity. Lower sensitivity also decreases the maximum distance from the touch sensor panel at which the touch sensor panel can detect a proximity event, because the distance above the touch sensor panel to which fringing electric fields extend is reduced.

In some mutual-capacitance-based touch sensor panels with sense electrodes formed from STC materials, gaps (through which fringing electric fields can extend) are formed in the sense layer to mitigate some of the negative effects of lowered touch sensitivity. These gaps, however, can result in undesirable optical effects, such as a nonuniform appearance that may be caused by optical fringing near the boundaries of the gaps and the solid STC material. Unlike STC materials, which are solid sheets of conductive material and thus may exhibit strong electromagnetic shielding capabilities, metal mesh materials comprise wires, arranged in grids, with spacing between the wires. Accordingly, metal mesh materials may provide weaker shielding than STC materials. The use of metal mesh instead of STC materials in a sense layer of mutual-capacitance-based examples of a touch sensor panel (e.g., in the manners provided in FIGS. 6A-6B) may therefore reduce or eliminate undesirable shielding. This in turn may allow fringing electric fields to extend further above the touch sensor panel, and with greater flux, which may enable the touch sensor panel to be more touch sensitive. These benefits can be realized without the need to form gaps in the sense layer, and to contend with the unwanted optical effects that could result.

The use of metal mesh instead of STC materials in a touch electrode also may reduce the material costs associated with manufacturing a touch sensor panel, such as in situations where STC materials such as ITO are expensive and/or subject to limited availability. Additionally, by reducing the need for two layers of STC material, as in some example touch sensor panels, a costly process of fabricating a dual-layer STC (e.g., dual-layer ITO (DITO)) structure can be avoided. Furthermore, in some examples, such as shown in FIGS. 6A and 6B, sense lines 632 formed of metal mesh and routing traces 634 comprise a single layer (e.g., layer 630) and can be fabricated in a single step, simplifying the touch sensor panel fabrication process compared to examples (such as those in which sense lines are formed of ITO) in which a touch electrode and the trace routing coupled to the touch electrode occupy separate layers. Combining sense lines 632 formed of metal mesh and routing traces 634 into one layer, instead of two layers as provided in some examples, may have the added benefit of reducing the overall thickness of the touch sensor panel.

In some mutual-capacitance-based examples, as described above, the use of metal mesh materials instead of STC materials for sense electrodes in a touch sensor panel may provide certain advantages. Advantages may also be provided by using STC materials for drive electrodes (and/or other touch sensor panel components) in the touch sensor panel. As described above, STC materials can exhibit strong shielding abilities, and in a sense layer, these shielding abilities may be undesirable because they can compromise the touch sensitivity of the touch sensor panel. However, the shielding abilities of STC materials may be desirable in a lower layer (e.g., a drive layer) to shield noise from nearby electronics, such as displays (as in examples in which the touch sensor panel is included in a touch screen). Replacing STC materials in a lower layer with metal mesh materials could reduce this desirable noise shielding, because metal meshes may not exhibit strong shielding abilities (due to their mesh structure, which may include large gaps through which electromagnetic fields can extend). Examples of the disclosure include a lower layer, such as a drive layer, comprised of STC materials. However, in some examples, as described above, metal mesh materials may be included in a lower layer (e.g., a drive layer) in addition to STC materials, as shown by metal mesh 629 in FIG. 6B, and their inclusion may convey a benefit of lowering sheet resistance, while maintaining the STC materials' beneficial shielding effect. Disposing such metal mesh materials below a layer of STC material, such as layer 624 in FIG. 6B, and in the same layer as routing traces, such as shown by routing traces 628 and metal mesh 629 in FIG. 6B, can allow the metal mesh 629 and the routing traces 628 to be fabricated in a single step, potentially saving fabrication time and expense, and need not increase the thickness of the touch sensor panel. However, in some examples, metal mesh can be disposed above a layer of STC material, rather than below it.

In some examples which do not feature two layers of touch electrodes—for example, a single layer mutual capacitance touch sensor panel such as shown in FIG. 4B, or a pixelated self-capacitance touch sensor panel such as shown in FIG. 4C—benefits can be realized by using STC material to form a shield layer below one or more touch electrodes. For example, shield layer 418 in FIG. 4B and/or shield layer 410 in FIG. 4C could be comprised of STC material. The STC materials in such a shield layer can provide noise shielding for touch electrodes disposed above the shield layer, in which the touch electrodes may be comprised of metal mesh materials.

The use of metal mesh materials in a touch sensor panel, as in sense lines 632 of FIGS. 6A and 6B and metal mesh 629 of FIG. 6B, presents a risk of undesirable optical effects, such as diffraction, scattering, and pattern visibility, if a display is disposed below the touch sensor panel (such as when the touch sensor panel is part of a touch screen). In some examples, these unwanted effects can be mitigated by inserting optical elements, such as polarizers and/or material layers, such as anti-reflective coating layers, on top of the touch sensor panel. Referring to FIGS. 6A and 6B, a polarizer, such as a circular polarizer, may be disposed above sense lines 632 formed of metal mesh (e.g., the polarizer can be in contact with the metal mesh of sense lines 632). This can have the effect of dampening undesirable diffraction caused when light from a display below stackup 600 or 650 passes through the metal mesh of sense lines 632. Additionally, in some examples, an anti-reflective film, such as DSG-03 (manufactured by Dai Nippon Printing Co., Ltd.), may be disposed above the polarizer (e.g., the antireflective film can be in contact with the polarizer) to dampen reflective glare and to potentially improve the durability of the touch screen.

Various configurations of lines ("layouts") in one or more metal meshes, such as sense lines 632 in FIGS. 6A and 6B, known to those skilled in the art, can be employed without departing from the scope of the examples of the disclosure. Layouts can vary, for example, in the shape of the metal lines (e.g. straight, sinusoidal), the relative orientation of the lines (e.g. orthogonal, 45 degrees, 30 degrees), the mesh pitch, and the line width. A first particular metal mesh layout might be preferred over a second layout in certain circumstances, such as where the first layout results in lower sheet resistance, lower intensity of Moiré effects, or improved line defect tolerance in comparison to the second layout. Some layouts may also be more economical to fabricate than other layouts. Additionally, in examples where metal mesh materials are used in multiple layers, such as in metal mesh 629 and sense lines 632 in FIG. 6B, a particular layout or orientation of the mesh in one layer, with respect to the metal mesh in a second layer, may provide benefits, such as avoiding Moiré effects that can result from two metal mesh layers aligned at a particular relative angle.

It may be desirable, particularly in touch screen applications, to reduce metal mesh visibility by blackening the exterior of the metal mesh to prevent light from being reflected from the metal mesh. In some examples, one or more blackening regions can be disposed above, below, and/or to the sides of a metal mesh (such as sense lines 632 in FIGS. 6A and 6B, or metal mesh 629 in FIG. 6B) to reduce the visibility of the metal mesh. In some examples, a blackening region is formed by oxidizing or nitriding the surface of a touch electrode. In other examples, a blackening region is electroplated nickel alloy film or conductive black ink film. Other techniques for blackening the exterior of the metal mesh will be familiar to those skilled in the art.

According to the above, some examples of the disclosure are directed to a touch sensor panel comprising: a first touch electrode of a first type associated with a first touch node on the touch sensor panel, the first touch electrode electrically connected to a first trace configured to couple the first touch electrode to first touch circuitry; and a second touch electrode of a second type associated with the first touch node on the touch sensor panel, the second touch electrode electrically connected to a second trace configured to couple the second touch electrode to second touch circuitry, wherein: the first touch electrode is formed by a solid and transparent conductive material in the touch sensor panel, the solid and transparent conductive material configured to provide shielding with respect to circuitry external to the touch sensor panel; and the second touch electrode is formed by a first metal mesh material in the touch sensor panel. Additionally or alternatively to one or more of the examples disclosed above, in some examples the second touch circuitry is configured to sense a mutual capacitance between the first touch electrode and the second touch electrode, the first touch electrode comprises one or more drive lines, and the second touch electrode comprises one or more sense lines. Additionally or alternatively to one or more of the examples disclosed above, in some examples the touch sensor panel is configured to fold along an axis that does not intersect the first touch electrode. Additionally or alternatively to one or more of the examples disclosed above, in some examples the touch sensor panel further comprises a second metal mesh material, electrically unconnected from the first metal mesh material, disposed adjacent to the first touch electrode. Additionally or alternatively to one or more of the examples disclosed above, in some examples the touch sensor panel further comprises a substrate layer and a display, wherein the first touch electrode is disposed between the substrate layer and the display, and the substrate layer is disposed between the first touch electrode and the second touch electrode. Additionally or alternatively to one or more of the examples disclosed above, in some examples the touch sensor panel further comprises a substrate layer, wherein the second touch electrode is disposed above the substrate layer, and layers between the substrate layer and the second touch electrode do not include a solid and transparent conductive material. Additionally or alternatively to one or more of the examples disclosed above, in some examples the solid and transparent conductive material comprises indium tin oxide. Additionally or alternatively to one or more of the examples disclosed above, in some examples the solid and transparent conductive material comprises silver nanowire. Additionally or alternatively to one or more of the examples disclosed above, in some examples the touch sensor panel further comprises a substrate layer and a polarizer, wherein the second touch electrode is disposed between the polarizer and the substrate layer. Additionally or alternatively to one or more of the examples disclosed above, in some examples the touch sensor panel further comprises a substrate layer and an anti-reflective layer, wherein the second touch electrode is disposed between the anti-reflective layer and the substrate layer.

Some examples of the disclosure are directed to a method for fabricating a touch sensor panel, the method comprising: forming a first touch electrode of a first type and a first trace, wherein the first touch node is associated with a first touch node on the touch sensor panel, the first touch electrode is electrically connected to the first trace, and the first trace is configured to couple the first touch electrode to first touch circuitry; and forming a second touch electrode of a second type and a second trace, wherein the second touch node is associated with the first touch node on the touch sensor panel, the second touch electrode is electrically connected to the second trace, and the second trace is configured to couple the second touch electrode to second touch circuitry, wherein: the first touch electrode is formed by a solid and transparent conductive material in the touch sensor panel, the solid and transparent conductive material configured to provide shielding with respect to circuitry external to the touch sensor panel, and the second touch electrode is formed by a first metal mesh material in the touch sensor panel.

Additionally or alternatively, in some examples, the second touch circuitry is configured to sense a mutual capacitance between the first touch electrode and the second touch electrode, the first touch electrode comprises one or more drive lines, and the second touch electrode comprises one or more sense lines. Additionally or alternatively, in some examples, the touch sensor panel is configured to fold along an axis that does not intersect the first touch electrode. Additionally or alternatively, in some examples, the method further comprises forming a second metal mesh material, electrically unconnected from the first metal mesh material, disposed adjacent to the first touch electrode. Additionally or alternatively, in some examples, the method further comprises forming a substrate layer and a display, wherein the first touch electrode is disposed between the substrate layer and the display, and the substrate layer is disposed between the first touch electrode and the second touch electrode. Additionally or alternatively, in some examples, the method further comprises forming a substrate layer, wherein the second touch electrode is disposed above the substrate layer, and layers between the substrate layer and the second touch electrode do not include a solid and transparent conductive material. Additionally or alternatively, in some examples, the solid and transparent conductive material comprises indium tin oxide. Additionally or alternatively, in some examples, the solid and transparent conductive material comprises silver nanowire. Additionally or alternatively, in some examples, the method further comprises forming a substrate layer and a polarizer, wherein the second touch electrode is disposed between the polarizer and the substrate layer. Additionally or alternatively, in some examples, the method further comprises forming a substrate layer and an anti-reflective layer, wherein the second touch electrode is disposed between the anti-reflective layer and the substrate layer.

Some examples of the disclosure are directed to an electronic device comprising: an energy storage device; communication circuitry; and a touch sensor panel comprising: a first touch electrode of a first type associated with a first touch node on the touch sensor panel, the first touch electrode electrically connected to a first trace configured to couple the first touch electrode to first touch circuitry; and a second touch electrode of a second type associated with the first touch node on the touch sensor panel, the second touch electrode electrically connected to a second trace configured to couple the second touch electrode to second touch circuitry, wherein the first touch electrode is formed by a solid and transparent conductive material in the touch sensor panel, the solid and transparent conductive material configured to provide shielding with respect to circuitry external to the touch sensor panel, and the second touch electrode is formed by a first metal mesh material in the touch sensor panel.

Additionally or alternatively, in some examples, the second touch circuitry is configured to sense a mutual capacitance between the first touch electrode and the second touch electrode, the first touch electrode comprises one or more drive lines, and the second touch electrode comprises one or more sense lines. Additionally or alternatively, in some examples, the touch sensor panel is configured to fold along an axis that does not intersect the first touch electrode. Additionally or alternatively, in some examples, the touch sensor panel further comprises a second metal mesh material, electrically unconnected from the first metal mesh material, disposed adjacent to the first touch electrode. Additionally or alternatively, in some examples, the touch sensor panel further comprises a substrate layer and a display, wherein the first touch electrode is disposed between the substrate layer and the display, and the substrate layer is disposed between the first touch electrode and the second touch electrode. Additionally or alternatively, in some examples, the touch sensor panel further comprises a substrate layer, wherein the second touch electrode is disposed above the substrate layer, and layers between the substrate layer and the second touch electrode do not include a solid and transparent conductive material. Additionally or alternatively, in some examples, the solid and transparent conductive material comprises indium tin oxide. Additionally or alternatively, in some examples, the solid and transparent conductive material comprises silver nanowire. Additionally or alternatively, in some examples, the touch sensor panel further comprises a substrate layer and a polarizer, wherein the second touch electrode is disposed between the polarizer and the substrate layer.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel configured to fold along an axis, the touch sensor panel comprising:
   a plurality of touch electrodes of a first type including a first touch electrode associated with a first touch node on the touch sensor panel and a third touch electrode associated with a second touch node on the touch sensor panel, the first touch electrode electrically connected to a first trace configured to couple the first touch electrode to first touch circuitry and the third touch electrode electrically connected to a third trace configured to couple the third touch electrode to the first touch circuitry;
   a second touch electrode of a second type associated with the first touch node on the touch sensor panel, the second touch electrode electrically connected to a second trace configured to couple the second touch electrode to second touch circuitry; and
   a substrate layer;
   wherein:
      the plurality of touch electrodes of the first type is formed by a solid and transparent conductive material in the touch sensor panel, the solid and transparent conductive material configured to provide shielding with respect to circuitry external to the touch sensor panel;
      the second touch electrode is formed by a first metal mesh material in the touch sensor panel;
      the axis of folding is between the first touch electrode and the third touch electrode without intersecting the first touch electrode or the third touch electrode; and
      the substrate layer is disposed between the first touch electrode and the second touch electrode.

2. The touch sensor panel of claim 1, wherein the second touch circuitry is configured to sense a mutual capacitance between the first touch electrode and the second touch electrode, the first touch electrode comprises one or more drive lines, and the second touch electrode comprises one or more sense lines.

3. The touch sensor panel of claim 1, further comprising a second metal mesh material, electrically unconnected from the first metal mesh material, disposed adjacent to the first touch electrode.

4. The touch sensor panel of claim 1, further comprising a a display, wherein the first touch electrode is disposed between the substrate layer and the display.

5. The touch sensor panel of claim 1, wherein the second touch electrode is disposed above the substrate layer, and layers between the substrate layer and the second touch electrode do not include a solid and transparent conductive material.

6. The touch sensor panel of claim 1, wherein the solid and transparent conductive material comprises indium tin oxide.

7. The touch sensor panel of claim 1, wherein the solid and transparent conductive material comprises silver nanowire.

8. The touch sensor panel of claim 1, further comprising a substrate layer and a polarizer, wherein the second touch electrode is disposed between the polarizer and the substrate layer.

9. The touch sensor panel of claim 1, further comprising a substrate layer and an anti-reflective layer, wherein the second touch electrode is disposed between the anti-reflective layer and the substrate layer.

10. The touch sensor panel of claim 1, further comprising:
a polarizer; and
a display;
wherein:
the first touch electrode is disposed between the substrate layer and the display;
the second touch electrode is disposed between the polarizer and the substrate layer; and
layers between the substrate layer and the second touch electrode do not include a solid and transparent conductive material.

11. A method for fabricating a touch sensor panel configured to fold along an axis, the method comprising:
forming a plurality of touch electrodes of a first type including a first touch electrode and a third touch electrode, a first trace, and a third trace, wherein the first touch electrode is associated with a first touch node on the touch sensor panel, the first touch electrode is electrically connected to the first trace, the first trace is configured to couple the first touch electrode to first touch circuitry, the third touch electrode is associated with a second touch node on the touch sensor panel, the third touch electrode is electrically connected to the third trace, and third trace is configured to couple the third touch electrode to the first touch circuitry;
forming a second touch electrode of a second type and a second trace, wherein the second touch electrode is associated with the first touch node on the touch sensor panel, the second touch electrode is electrically connected to the second trace, and the second trace is configured to couple the second touch electrode to second touch circuitry; and
disposing a substrate layer between the first touch electrode and the second touch electrode;
wherein:
the plurality of touch electrodes of the first type is formed by a solid and transparent conductive material in the touch sensor panel, the solid and transparent conductive material configured to provide shielding with respect to circuitry external to the touch sensor panel,
the second touch electrode is formed by a first metal mesh material in the touch sensor panel; and
the axis of folding is between the first touch electrode and the third touch electrode without intersecting the first touch electrode or the third touch electrode.

12. An electronic device comprising:
an energy storage device;
communication circuitry; and
a touch sensor panel configured to fold along an axis, the touch sensor panel comprising:
a plurality of touch electrodes of a first type including a first touch electrode associated with a first touch node on the touch sensor panel and a third touch electrode associated with a second touch node on the touch sensor panel, the first touch electrode electrically connected to a first trace configured to couple the first touch electrode to first touch circuitry and the third touch electrode electrically connected to a third trace configured to couple the third touch electrode to the first touch circuitry;
a second touch electrode of a second type associated with the first touch node on the touch sensor panel, the second touch electrode electrically connected to a second trace configured to couple the second touch electrode to second touch circuitry; and
a substrate layer,
wherein:
the plurality of touch electrodes of the first type is formed by a solid and transparent conductive material in the touch sensor panel, the solid and transparent conductive material configured to provide shielding with respect to circuitry external to the touch sensor panel;
the second touch electrode is formed by a first metal mesh material in the touch sensor panel;
the axis of folding is between the first touch electrode and the third touch electrode without intersecting the first touch electrode or the third touch electrode; and
the substrate layer is disposed between the first touch electrode and the second touch electrode.

13. The electronic device of claim 12, wherein the second touch circuitry is configured to sense a mutual capacitance between the first touch electrode and the second touch electrode, the first touch electrode comprises one or more drive lines, and the second touch electrode comprises one or more sense lines.

14. The electronic device of claim 12, wherein the touch sensor panel further comprises a second metal mesh material, electrically unconnected from the first metal mesh material, disposed adjacent to the first touch electrode.

15. The electronic device of claim 12, wherein the touch sensor panel further comprises a display, wherein the first touch electrode is disposed between the substrate layer and the display.

16. The electronic device of claim 12, wherein the second touch electrode is disposed above the substrate layer, and layers between the substrate layer and the second touch electrode do not include a solid and transparent conductive material.

17. The electronic device of claim 12, wherein the solid and transparent conductive material comprises indium tin oxide.

18. The electronic device of claim 12, wherein the solid and transparent conductive material comprises silver nanowire.

19. The electronic device of claim 12, wherein the touch sensor panel further comprises a polarizer, wherein the second touch electrode is disposed between the polarizer and the substrate layer.

20. The electronic device of claim 12, the touch sensor panel further comprising:
a polarizer; and
a display;
wherein:
the first touch electrode is disposed between the substrate layer and the display;
the second touch electrode is disposed between the polarizer and the substrate layer; and
layers between the substrate layer and the second touch electrode do not include a solid and transparent conductive material.

* * * * *